United States Patent [19]
Visch

[11] 3,923,480
[45] Dec. 2, 1975

[54] OIL SEPARATOR

[75] Inventor: Tonny Dirk Henricus Visch, Weesp, Netherlands

[73] Assignee: James Howden Holima B.V., Amsterdam, Netherlands

[22] Filed: Apr. 18, 1973

[21] Appl. No.: 352,451

[30] Foreign Application Priority Data
Apr. 19, 1972 Netherlands.................. 7205226

[52] U.S. Cl................... 55/257; 55/269; 55/321; 55/465; 55/DIG. 25
[51] Int. Cl.².......................................... B01D 47/00
[58] Field of Search.......................... 55/185–187, 55/257–259, 462, 465, 482, 320, 321, 324, 97, DIG. 25, 269

[56] References Cited
UNITED STATES PATENTS

| | | |
|---|---|---|
| 2,716,509 | 8/1955 | Saul .................. 55/257 X |
| 2,745,513 | 5/1956 | Massey .................. 55/DIG. 25 X |
| 3,134,825 | 5/1964 | Sexton .................. 55/259 X |
| 3,135,592 | 6/1964 | Fairs et al. .................. 55/DIG. 25 X |
| 3,591,947 | 7/1971 | Sexton .................. 55/259 X |
| 3,721,069 | 3/1973 | Walker .................. 55/320 X |

*Primary Examiner*—Frank W. Lutter
*Assistant Examiner*—William Cuchlinski, Jr.
*Attorney, Agent, or Firm*—Haseltine, Lake & Waters

[57] ABSTRACT

An oil separator of the demister-type wherein a conduit directs an oil containing gas into a tank, at least two demister packs in the tank, the first pack operating in a supersaturated condition and the last pack operating in an unsaturated condition, at least one baffle in the tank for reversing the gas flow before or after passing a demister pack to remove large and small oil droplets so as not to impose limitations on the capacity control of the compressor.

9 Claims, 3 Drawing Figures

OIL SEPARATOR

BACKGROUND OF THE INVENTION

The present invention relates to an oil separator. These devices are used in compressor apparatus for removal of entrained oil particles in the pressure line of compressors.

Especially with screw compressors with oil injection, large amounts of oil are injected into the compressor chamber for sealing of the rotors, lubrication of the bearings and balancing of axial forces. Oil is also used in other compressors, which oil is partially carried away as fine droplets with the gas which is removed by the pressure line of the compressor.

In cooling devices excessive amounts of entrained oil are harmful, because they are detrimental to the heat transfer. Therefore it is usual to remove this oil by use of an oil separator in the pressure line of the compressor.

However, the use of oil separators introduces a number of problems. In the first place, the operation of the oil separator is adversely affected by control of the capacity of the compressor (for instance by means of a control slide with screw compressors or by means of cutting out of cylinders with piston compressors). The operation of the oil separator is generally only optimal with one fixed capacity.

In the second place, an oil separator is designed for optimal operation at a fixed particle size of the oil droplets. However, when the temperature of the compressor increases, the particle size of the oil droplets decreases. The smaller these particles, the more difficult they are to remove. Most difficulties in this respect are encountered with particles of a size between 0.1 micron and 5 microns.

According to the present state of industrial development, it is very well possible to obviate all these objections, but the required apparatus is costly and often very bulky, especially when it is necessary to remove fine particles between 0.1 and 5 microns in size.

The known devices of this kind are based on the following principles.

1. Decreasing the flow velocity of the gas. To this end a normal tank is used without special provisions. The smaller the particles, the larger the tank will be which is necessary for settling of the particles. For very small particles, a very large tank should be used. In practice, the usefulness of this method ends below a particle size of 40 microns.

2. In a variant of the method mentioned under 1, use is made of tangential introduction of the gas stream, combined with the use of baffles and the like. In this manner the practical usefulness of this method may be extended to a particle size of about 20 microns.

3. Cyclone separators. They operate by means of an increase of the velocity to a certain maximum, thus attaining a higher effect than in the method under 2. The limit of practical usefulness is reached here with particles of about 5 microns. Smaller particles than 5 microns will normally pass.

4. Oil separators of the impact type, for instance packed with Raschig rings. Because of the incessant impacts of the gas with the surfaces of the rings the oil is retained on the surfaces of the rings.

5. Demisters. These oil separators comprise a pack of wire gauze, through which the gas stream is passed. For the gas, the wire gauze is only an insignificant obstacle, but there is a great chance that the oil droplets will contact the wire gauze and that they will then adhere thereto.

6. The hydrophobic filters are based on the same principle and comprise polyester or glass fibers. For small particles they give better results than the usual demisters. For particles of a size of 0.1 to 5 microns, a yield of 99.95 percent may be obtained. However, the system operates with very low velocities, so that the necessary apparatus should be very bulky. Particles above 10 microns, however, give a negative effect and therefore a pre-separation with method 1–5 is necessary.

7. The synthetic resin filter elements of the registered trade mark "Pall" are based on a difference in surface tension between gas and oil. These filter elements also only allow passage of very small particles. The allowable velocities are here very low, too. Also is it valid here that particles larger than 10 microns cannot be digested and that a pre-separation with method 1–5 is necessary.

Only methods 6 and 7 give excellent results with small particles, however, at a high cost. The methods 2, 4 and 5 are not particularly expensive, but they are not so efficaceous for small particles. The best of these is still method 5.

BRIEF SUMMARY OF THE INVENTION

It is an object of the invention to provide an oil separator which is not very bulky and not very expensive, the effectiveness of which is a match for the methods 6 and 7, so that it is also able to remove particles between 0.1 and 5 microns, and is effective for particles of 5–100 microns, too.

Correspondingly the invention provides an oil separator of the demister type with a tank and lines therein, which are passed by a gas stream, and two or more demister packs inserted in or between the lines, in which the lines are designed in such a manner that the direction of the gas stream will reverse either before or after passing at least one demister pack, while at least a first demister pack operates in supersaturated condition, but at least the last pack operates in unsaturated condition. Preferably the reversal of the direction takes place both before and after passing the first demister pack. The removal of oil particles may still be improved by providing in the locations of the reversals a demister pad in such a manner that the incoming gas stream impinges on it. A greater effect may be achieved, too, by introducing in this location cooled oil, which unites with the hot incoming gases and thus increases the size of the minimal particle dimensions. In a preferred embodiment, the lines comprise a set of concentric tubes provided with baffles and concentric demister packs. The number of demister packs is preferably two. It has its advantages when the tank with lines and demister packs is set up in a vertical position. The disengaged oil droplets, which are accumulating, will then pass through the demister packs and moisten them, which increases the oil separating function of these packs. In this embodiment, an oil outlet is provided in the lower part of the tank below the reversal location in the gas stream and a gas outlet is provided in the upper part of the tank above these reversal locations.

The oil separator according to the invention has many important advantages over existing known devices of this kind. In the first place, the device is small with respect to its capacity and therefore not very expensive. In the second place, the device operates both at high and low flow velocities of the gas to be purified, thus allowing control of the capacity of the compressor without harming the operation of the oil separator. In the third place, the resistance encountered by the gas in the demister packs is much smaller in the design according to the invention as compared with a design with demister packs in series at the same flow velocity, that is to say that the oil separator according to the invention exerts less influence on the useful effect of the compressor.

BRIEF DESCRIPTION OF THE DRAWING

The invention is now further elucidated with reference to the enclosed drawing, which represents a non-limiting preferred embodiment of a device according to the invention.

DETAILED DESCRIPTION OF THE INVENTION

Figure 1:
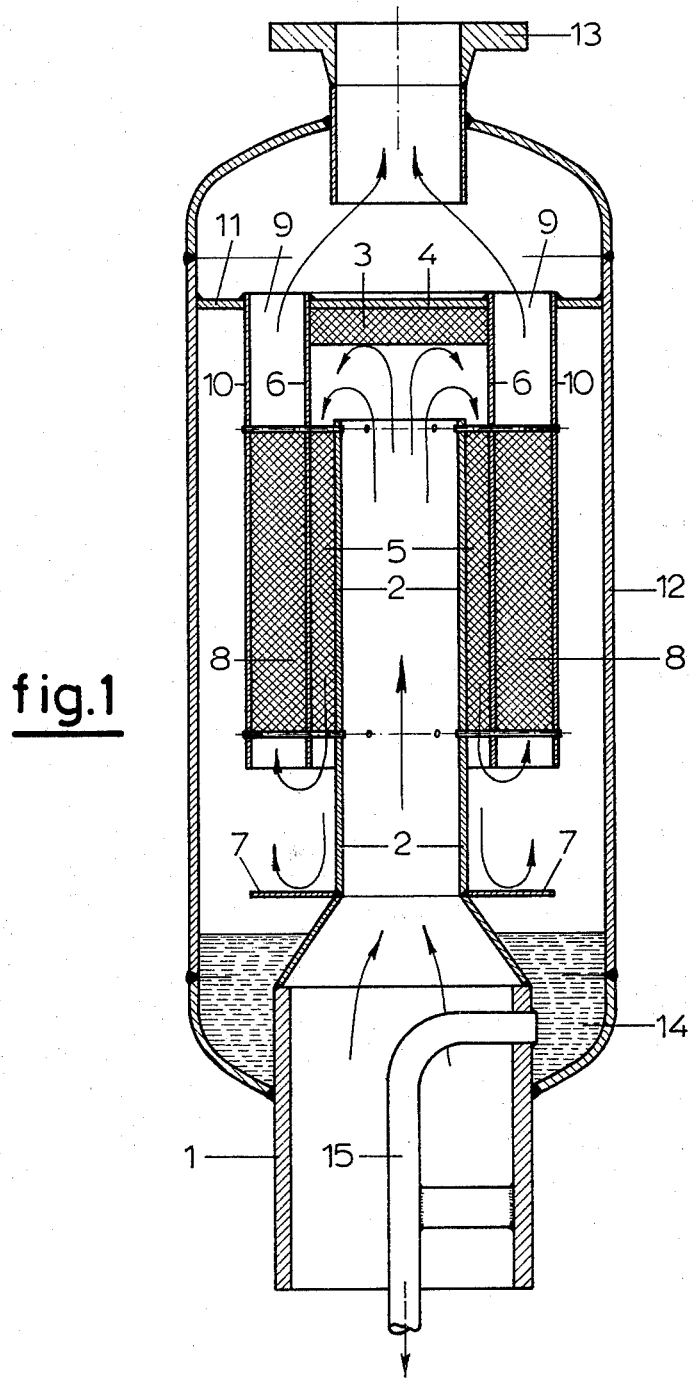
FIG. 1 is a vertical cross-section of a preferred embodiment of a device according to the invention.

In FIG. 1 the inlet is indicated by 1. Through this inlet 1 the gases enter the separator space with oil particles varying in dimensions between 0.1 and 100 microns. This inlet 1 may be mounted on or in a horizontal or vertical oil surge vessel (not indicated in the drawing) or may be part of a vertical vessel.

Through the inlet 1 and an ascending tube 2 the gases are blown with the oil particles against a droplet pack 3 comprising metal or synthetic resin wool and mounted against a back plate or first baffle 4.

In front of this pack 3 the gases must change their direction an angle of 180° because of the presence of the baffle 4. For the gas particles this is hardly an inconvenience, but for the heavier oil particles this is not so easy because of the large difference in weight between both kinds of particles. The pack 3 now absorbs oil particles until it is saturated with oil. Further increase of oil content will cause the excess of oil to fall out of the pack as droplets with a larger volume than the impinging particles. These larger droplets are entrained with the gas stream towards the first demister 5. Part of the oil surplus in the pack 4 will also run along the wall 6 downwards to the demister 5.

Then the demister 5 will operate in a supersaturated condition because of which droplets arise which are again larger than the incoming particles.

The gases issuing from a demister subsequently impinge on the second baffle 7 and again change their direction through an angle of 180°. Now the gases flow upwards through second demister 8. During this second reversal of direction the largest particles fall out of the gas stream. The smaller particles have grown in the mean time sufficiently and are now removed in excess of 99 percent by the second demister 8. The gases leave the demister pack 8 through the annular opening 9, defined by the walls 6 and 10 enclosing the demister pack. Walls 6 and 10 form two concentric tubes. The tube formed by wall 6 is closed by the first baffle 4, while the tube formed by the wall 10 is welded at its outside surface to the annular partition 11, which is sealingly welded to the shell 12 of the oil separator. This shell 12 is also sealingly welded to the inlet 1 at the bottom and to an outlet 13 at the top. The outlet 13 is in open association with the annular opening 9. For removal of oil running down from the baffle 7, which is accumulating in the lower part 14 of the shell 12, an oil removal line 15 is provided concentrically within the inlet 1.

Figure 2:
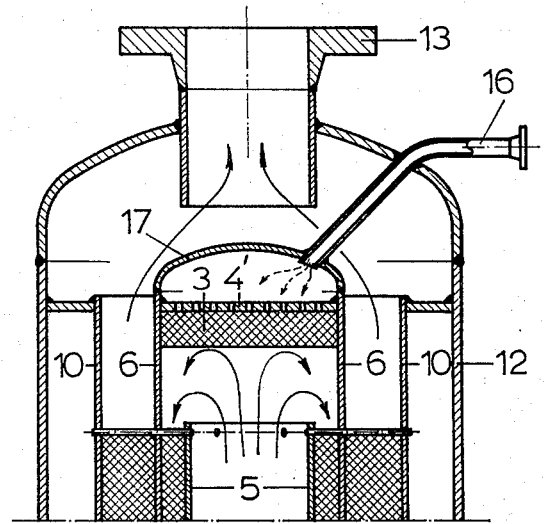
FIG. 2 represents a vertical cross-section of the upper part of a modified device according to FIG. 1.

The device illustrated in FIG. 2 is completely analogous to the device according to FIG. 1, with the exception of a separate oil feed line 16, serving for feeding cooled oil to the demister pack 3. To this end the baffle 4 is substituted by screen 4', while the oil feed line discharges into a dome-shaped closure 17, which forms a supply chamber for cooled oil together with walls 6.

Figure 3:
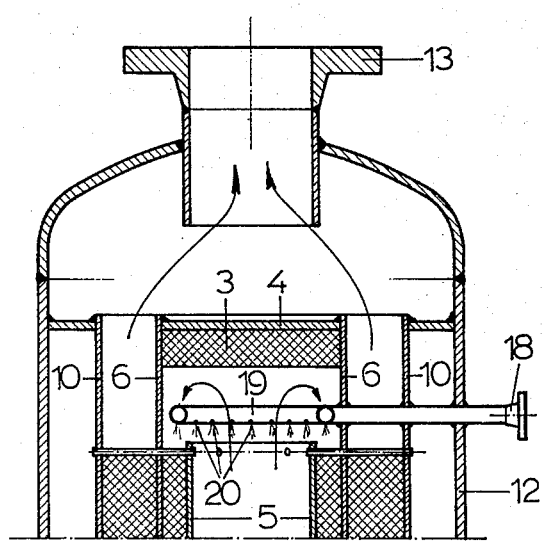
FIG. 3 is a vertical cross-section of the upper part of a modification of a device according to FIG. 1.

A modified form of introducing cooled oil is illustrated in FIG. 3, in which cooled oil in feeding line 18 enters an annular spraynozzle 19 with spray openings 20, designed in such a manner that the discharging cool oil impinges on the first demister pack 5.

Of course, it is also possible to spray cooled oil into a gas stream at other locations, for instance countercurrently with the gases in the feeding line 2 from FIG. 1.

What I claim is:

1. An oil separator of the demister type comprising a tank having an inlet for flow of a gas stream containing oil to be separated and an outlet for flow of the gas stream from which oil has been separated, a conduit in said tank connected to said inlet for conveying the gas stream into the tank, said conduit having an open outlet in said tank, a baffle in said tank facing said outlet for reversing the direction of flow of the gas stream, means defining first and second passages in said tank for flow of the gas stream therethrough, a first demister pack in said first passage having an inlet facing said baffle for flow of the reversed gas stream therethrough and an outlet for exit of the gas stream, said first demister pack operating in supersaturated condition and extracting oil from said gas stream passing therethrough, a second baffle in said tank facing the outlet of said first demister pack to effect a second reversal of the gas stream, a second demister pack in said second passage having an inlet facing said second baffle for flow of the gas stream therethrough after the second reversal of said gas stream and an outlet for exit of the gas stream connected to said outlet of the tank, said second demister pack operating in unsaturated condition and extracting oil from said gas stream, and means in said tank for collecting oil extracted by said first and second demister packs.

2. An oil separator according to claim 1, wherein said gas inlet, said passages and said baffles are arranged in such manner that said gas stream flows downwardly through said first demister pack.

3. An oil separator according to claim 1, comprising a third demister pack positioned on said first baffle such that the incoming gas stream in said conduit will impinge thereon.

4. An oil separator according to claim 1, wherein said means defining said first and second passages in said tank comprises a set of concentric tubes, said first and second demister packs being concentrically mounted in said tubes.

5. An oil separator according to claim 4, wherein said gas inlet, said passages and said baffles are arranged in such manner that said gas stream flows downwardly through said first demister pack.

6. An oil separator according to claim 5 wherein said means for collecting oil is located in the bottom part of said tank, and said gas outlet is located in the upper part of said tank.

7. An oil separator according to claim 1 comprising a line including a distributing device for introduction of cooling oil into the gas stream prior to entry into the inlet of said first demister pack.

8. An oil separator according to claim 7 wherein said distributing device includes a discharge outlet for the cooling oil into said first demister pack.

9. An oil separator according to claim 1 wherein said inlet is at the bottom of the tank and said gas stream flows upwardly in said conduit to said first baffle, then downwardly through the first demister pack, then upwardly through the second demister pack, said gas outlet being at the top of the tank, and said oil collecting means at the bottom of the tank in isolation from said inlet.

* * * * *